Figure 1:
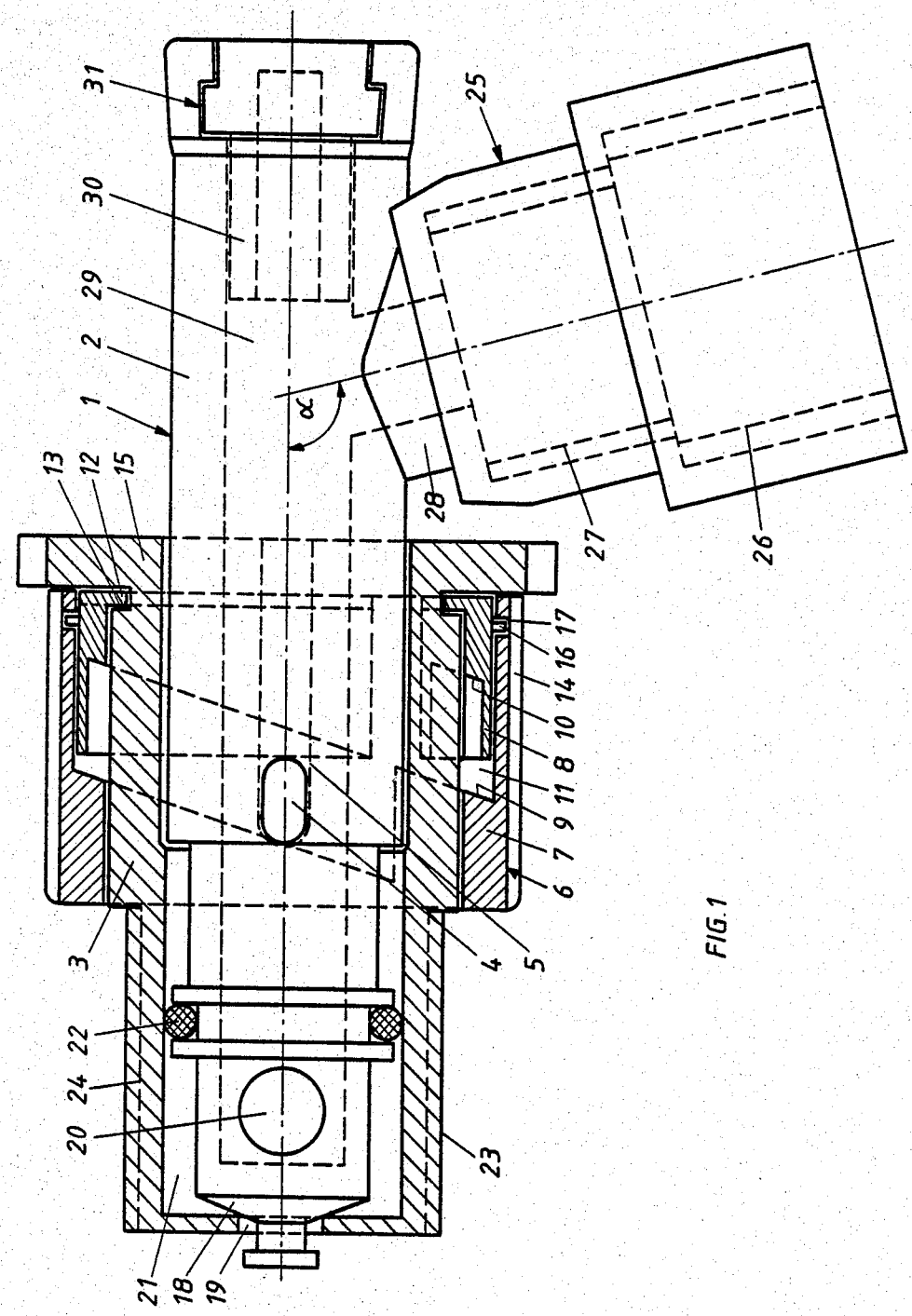

United States Patent [19]

Vogt et al.

[11] Patent Number: 4,527,742
[45] Date of Patent: Jul. 9, 1985

[54] WASHING APPLIANCE

[75] Inventors: Peter Vogt, Vienna; Volkwin Hoffelner, St.Andrä-Wördern, both of Austria

[73] Assignee: Veropa Dkfm. Peter Vogt KG, Vienna, Austria

[21] Appl. No.: 553,391

[22] Filed: Nov. 18, 1983

[30] Foreign Application Priority Data

Nov. 22, 1982 [AT] Austria .................................. 4240/82

[51] Int. Cl.³ .............................................. A62C 31/02
[52] U.S. Cl. ...................................... 239/391; 239/600
[58] Field of Search ....................... 239/390, 391, 600; 285/177; 403/289, 343

[56] References Cited

U.S. PATENT DOCUMENTS 4,456,180 6/1984 Lury ..................................... 239/600

Primary Examiner—Andres Kashnikow
Assistant Examiner—Scott D. Malpede
Attorney, Agent, or Firm—Fleit, Jacobson, Cohn & Price

[57] ABSTRACT

In a washing appliance comprising a liquid flow-regulating and shut-off valve and a conduit pipe connected to said valve, the regulating and shut-off valve comprises an inlet fitting and an outlet fitting for the supply and discharge of liquid, respectively. Each of said fittings is provided with at least one male and/or female coupling portion and the outlet fitting may consist of a spray nozzle. In a regulating and shut-off valve in which said fittings extend at an angle to each other, the conduit pipe is provided at its ends with corresponding male or female coupling portions so that it can be selectively connected to one fitting or the other.

7 Claims, 3 Drawing Figures

WASHING APPLIANCE

SUMMARY OF THE INVENTION

A washing appliance comprises an angled holder, which has an inlet fitting and an outlet fitting for conducting the washing liquor, and a conduit pipe, which can be selectively connected to one fitting or the other.

This invention relates to a washing appliance comprising a liquid flow-regulating and shut-off valve and a conduit pipe connected to said valve, which includes an inlet fitting and an outlet fitting for the supply and discharge of liquid, respectively. Each of said fittings is provided with at least one male and/or female coupling portion.

The outlet fitting may consist of a spray nozzle.

It is an object of the invention to provide a washing appliance which can be altered with a few manipulations so that it can be used to wash the roof, the underfloor or the side walls of a vehicle, even of a large vehicle, such as a bus or the like, while the appliance can be held conveniently.

That object cannot be accomplished with the known appliances and in an appliance of the kind described first hereinbefore is accomplished in accordance with the invention in that the regulating and shut-off valve is provided with fittings extending at an angle to each other and the conduit pipe is provided at its ends with corresponding male or female coupling portions so that it is adapted to be selectively connected to one fitting or the other.

The regulating and shut-off valve comprises an adjusting handle consisting of a composite sleeve, which is mounted on an outer tube so as to be rotatable and to be held against an axial displacement in at least one direction and which is provided on its inside surface with a helical groove, into which a pin, wing or the like projection extends. A sleevelike component of the sleeve has on one side of the groove a backing surface for engagement by the pin, wing or the like projection. Another sleeve-like component of the sleeve has on the other side of the groove a backing surface for engagement by the pin, wing or the like projection. At least one guide slot is formed in the outer tube and is open toward the end which is remote from the nozzle end so that the inner tube provided with the pin, wing or the like projection or projections can easily be pushed into the outer tube.

That arrangement permits of an adjustment of the relative position of the pintle and of the orifice of the nozzle so that the flow area of the nozzle orifice can be adjusted as desired and can be reduced to zero in order to prevent any discharge, i.e. to effect a shut-off. That washing appliance is mainly intended for washing passenger cars and larger vehicles, such as buses.

The regulating valve can desirably be connected, e.g. to the end of a pipe, which is connected to the hose, and in that case can be used for spraying liquid on a vehicle or to clean the roof of a vehicle, particularly a bus, by means of a scrubbing brush mounted on the outlet fitting. The regulating valve may be connected between the hose and the tube, if desired. Alternatively, the regulating valve may be mounted on the coupling element of the hose and be used to spray liquid, or if a scrubbing brush has been mounted on the outlet fitting the regulating valve may be used to clean those portions of the vehicle which are accessible by hand.

According to a further feature of the invention the coupling portions are formed in known manner with external and internal screw threads.

Alternatively, the coupling portions may constitute bayonet joints, snap joints or the like so that they can easily be connected and disconnected.

To facilitate the handling and movement of the regulating valve, the longitudinal axes of the coupling portions of the two fittings preferably extend at an angle $\alpha$ of 80 to 120 degrees.

Figure 2:
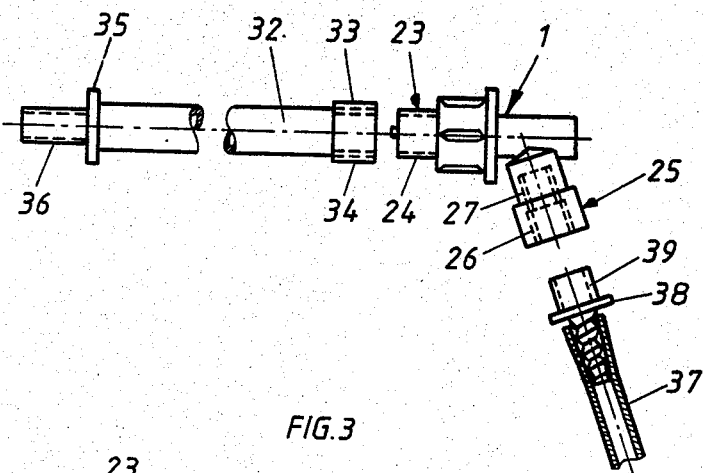
Figure 3:
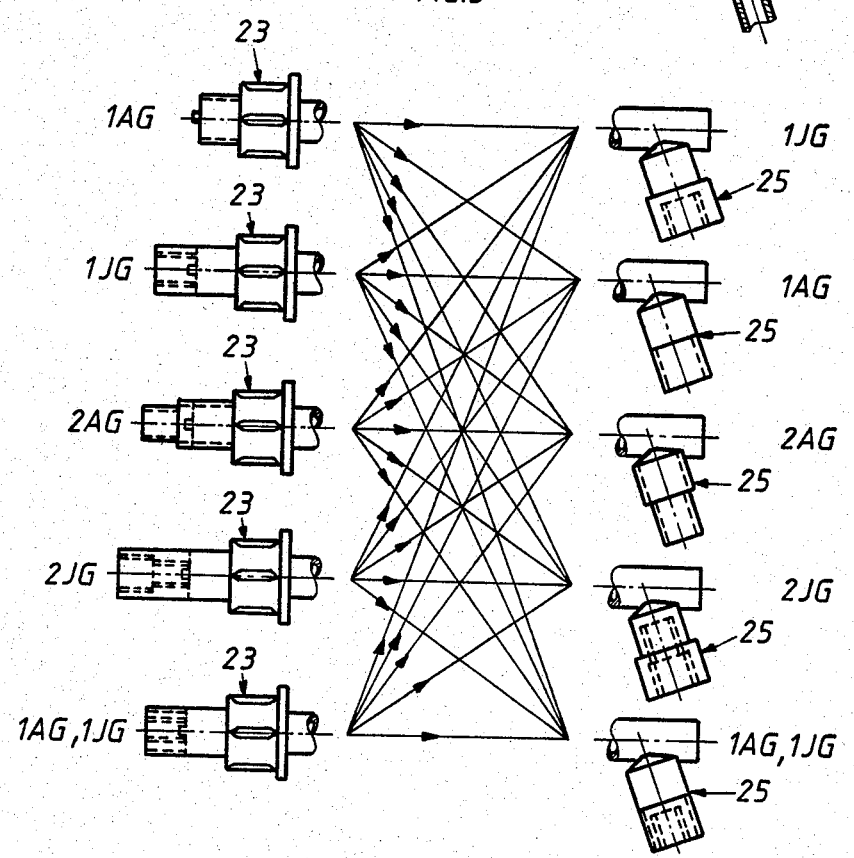

Further features and details of the invention will now be described with reference to the drawings, in which FIG. 1 is a view which is partly in transverse section and shows an illustrative embodiment of a regulating valve intended for use in the washing appliance according to the invention, FIG. 2 shows the regulating valve of FIG. 1 together with a pipe and a hose in an arrangement according to the present invention, and FIG. 3 shows the inlet and outlet fittings which are provided with internal and external screw threads, and the 25 combinations which are permitted.

FIG. 1 shows a modified regulating valve 1, which comprises an inner tube 2, which is axially slidably mounted in an outer tube 5. To prevent a rotation of the inner tube 2 relative to the outer tube 3 and to permit an axial displacement of the inner tube from the outside, the inner tube 2 is provided with two radially outwardly protruding wings 4, which extend into axially extending guide slots 5 formed in the outer tube 3. The wings 4 protrude outwardly through the guide slots 5. An adjusting handle is connected to the outer end of both wings 4 and can be used to impart by means of the wings 4 an axial displacement to the inner tube 2 relative to the outer tube 3. The adjusting handle consists of a sleeve 6, which is mounted on the outer tube 3 so as to be rotatable and to be held against axial displacement. That sleeve 6 comprises two interconnected sleevelike components 7, 8. Each of the components 7, 8 has a backing surface 9 or 10, respectively, for engagement by the wings 4. The two backing surfaces 9, 10 define on the inside surface of the sleeve 6 a groove 11, into which the wings 4 protrude. Backing surfaces for engagement by the wings 4 are thus provided on both sides of each wing and the sleeve 6 is movable to impart an axial movement in one direction or the other to the wings 4 extending into the groove. The sleeve 6 is held against axial displacement because the sleeve 6 has an inwardly directed rim 12, which enters a groove 15 formed in the outer tube 3. During the above-mentioned adjusting movement, the sleeve 6 is rotated so that the point where each wing 4 engages one or the other of the backing surfaces is shifted and the wings 4 and the inner tube are axially displaced relative to the outer tube 3. To ensure that the inner tube 1 will be shifted smoothly, without jerks, the backing surfaces 9, 10 are helical. The sleeve 6 is formed on its outside surface with grooves 14, which facilitate the turning of the sleeve 6 by hand. The operation of the regulating valve 1 is further facilitated in that the outer tube 3 is formed with a holding handle consisting of a flange 15. It will be understood that the rim 12 may be replaced by other projections, such as pins or the like.

The two sleevelike components 7, 8 of the sleeve 6 are interconnected by a snap joint consisting of pins 16 carried by the component 8 and mating holes 17, which are formed in the component 7 and receive the pins 16.

At that end which is on the left in FIG. 1, the inner tube 2 carries a pintle 18, which is movable into a constricted nozzle orifice 19 formed in the outer tube 3. Close to the pintle 18, the inner tube 2 has an outlet opening 20 so that a passage 21 defined by the inner tube 2 and the outer tube 3 is provided between the outlet opening 20 and the nozzle orifice 19. Said passage 21 is adapted to conduct the liquid supplied to the regulating valve. Behind the outlet opening 20, a sealing element 22 is provided, which seals the inner and outer tubes against each other so that an undesired outflow of the liquid which is supplied will be prevented. It is apparent that the outer tube constitutes an outlet fitting 23 and is provided for this purpose with a coupling portion formed, e.g. with external screw threads 24.

At the end which is on the right in FIG. 1, the inner tube 2 is provided with an inlet fitting 25, which extends at an angle α of 80 to 120 degrees to the longitudinal axis of the inner tube 2 and of the outlet fitting 23. The inlet fitting comprises two coupling portions having internal screw threads 26, 27, which differ in diameter and communicate through a bore 28 with the bore 29 of the inner tube 2.

The components of the regulating valve 1 are preferably made of plastic, except for the sealing element 22. To simplify the manufacture the inner tube 2 shown in FIG. 1 is continued to the right beyond the opening of the bore 28 of the inlet fitting 25. The bore 29 of the inner tube 2 is sealed by a plug 30, which is secured to the inner tube 2 by a snap joint 31.

FIG. 2 shows possible uses of the regulating valve 1 according to the invention shown in FIG. 1.

For washing the roof of a vehicle, a coupling portion 33 which is provided at the end of a pipe 32 and has internal screw threads 34 is screwed to the external screw threads 24 of the outlet fitting 23 shown in FIG. 1. At its other end, the pipe 32 has a coupling portion 35 having external screw threads, to which a washing implement, e.g. a scrubbing brush (not shown), can be screwed. A coupling element 38 is secured to a hose 37 and carries external screw threads 39, which are adapted to be screwed into the larger internal screw threads 26 of the inlet fitting 25. When the several components are connected in that manner, the left hand of the operator can be used, e.g. to hold and move the regulating valve 1 and the right hand can be used to hold and move the pipe 32. The flow rate can be conveniently adjusted by means of the regulating valve 1.

In another possible use, the pipe 32 is connected between the inlet fitting 25 and the hose 37. For that purpose the external screw threads 36 of the coupling portion 35 of the pipe 32 are screwed into the smaller internal screw threads 27 of the inlet fitting 25 and the external screw threads 39 of the coupling element 38 provided on the hose 37 are screwed into the internal screw threads 34 of the coupling portion 35 of the pipe. In that case the flow rate can be adjusted first and the regulating valve 1 provided at the end of the pipe 32 can subsequently be used for spray washing operation.

In a third possible arrangement, the regulating valve 1 is directly secured to the hose 37 and is used for spray washing or for a washing operation with a washing implement secured to the regulating valve 1. That arrangement in which the regulating valve 1 is secured to the hose 1 is particularly suitable for the cleaning of the side parts of a vehicle. For that purpose the external screw threads 59 of the coupling element 38 provided on the hose 37 are screwed into the larger internal screw threads 26 of the inlet fitting 25.

FIG. 5 shows possible designs of the outlet fitting 23 on the left and possible designs of the inlet fitting 25 on the right. In each case, one set of external screw threads (1AG) or one set of internal screw threads (1JG) or two sets of external screw threads (2AG) or two sets of internal screw threads (2JG) or one set of external screw threads and one set of internal screw threads (1AG, 1JG) may be provided. This permits of 25 combinations, which are indicated by arrows. It will be understood that the coupling portions may comprise connecting means other than screw threads, such as parts of bayonet joints, snap joints or the like, and such coupling portions may also be used in the combinations shown in FIG. 3.

A total of 25 combinations are possible.

What is claimed is:

1. A washing appliance, particularly for washing the body of motor vehicles, comprising a holder having two fittings extending at an angle to each other, said holder being provided with a liquid flow-regulating and shut-off valve, one of said fittings being connected to means for supplying washing liquor, the other fitting serving for a discharge of the washing liquor, a conduit pipe being adapted to be selectively connected to one fitting or the other and being provided at both ends with means for coupling said conduit pipe to mating means provided on one fitting or the other, said conduit pipe being adapted to have a washing implement connected to either end of the conduit pipe.

2. A washing appliance according to claim 1, characterized in that at least one of the two fittings is provided with two coupling portions differing in outside diameter.

3. A washing appliance according to claim 1, characterized in that at least one of the two fittings is provided with two coupling portions differing in inside diameter.

4. A washing appliance according to claim 1, characterized in that the coupling portions are provided with external and internal screw threads.

5. A washing appliance according to claim 1, characterized in that the inlet fitting is provided with internal screw threads and the outlet fitting is provided with external screw threads.

6. A washing appliance according to claim 1, characterized in that the inlet fitting is provided with two sets of internal screw threads differing in diameter and the outlet fitting is provided with external screw threads.

7. A washing appliance according to claim 1, characterized in that the longitudinal axes of the coupling portions of the two fittings extend at an angle α of 80 to 120 degrees to each other.

* * * * *